US012810785B2

(12) United States Patent
Ishiki et al.

(10) Patent No.: US 12,810,785 B2
(45) Date of Patent: Nov. 24, 2026

(54) CONTROLLER, LIGHT SOURCE CONTROL SYSTEM, AND DISPLAY SYSTEM

(71) Applicant: SEIKO EPSON CORPORATION, Tokyo (JP)

(72) Inventors: Yuya Ishiki, Komagane (JP); Naoya Takikawa, Tachikawa (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 19/248,958

(22) Filed: Jun. 25, 2025

(65) Prior Publication Data

US 2026/0004722 A1 Jan. 1, 2026

(30) Foreign Application Priority Data

Jun. 26, 2024 (JP) ................................ 2024-102697

(51) Int. Cl.
*G09G 3/32* (2016.01)

(52) U.S. Cl.
CPC .......... *G09G 3/32* (2013.01); *G09G 2360/16* (2013.01); *G09G 2370/08* (2013.01)

(58) Field of Classification Search
CPC .................................................. G09G 2360/16
See application file for complete search history.

(56) References Cited

U.S. PATENT DOCUMENTS

| | | | | |
|---|---|---|---|---|
| 9,183,790 | B2 * | 11/2015 | Lee | G09G 3/3426 |
| 11,929,043 | B1 * | 3/2024 | Wang | G09G 3/3426 |
| 2004/0257329 | A1 * | 12/2004 | Park | G09G 3/3648 345/102 |
| 2009/0140658 | A1 * | 6/2009 | Jo | H05B 45/12 315/156 |
| 2018/0334085 | A1 * | 11/2018 | Ichikawa | B60Q 1/1415 |
| 2019/0013826 | A1 * | 1/2019 | Kikuta | H04N 7/183 |
| 2020/0342796 | A1 * | 10/2020 | Kobayashi | G09G 3/2096 |
| 2023/0073794 | A1 * | 3/2023 | Akiba | B60K 35/415 |
| 2024/0038110 | A1 | 2/2024 | Kobayashi | |
| 2024/0116427 | A1 | 4/2024 | Kato et al. | |

FOREIGN PATENT DOCUMENTS

WO 2022-270414 A1 12/2022

* cited by examiner

*Primary Examiner* — Bipin Gyawali
(74) *Attorney, Agent, or Firm* — Harness, Dickey & Pierce, P.L.C.

(57) ABSTRACT

A controller includes a control data generation circuit that generates control data based on luminance data, a first interface circuit that transmits the control data, a first storage circuit that stores first comparison data based on the luminance data or the control data, and an error detection circuit. A light source driver includes a second interface circuit that receives the control data, a second storage circuit that stores the control data, and a drive circuit that drives a light source based on the control data. The error detection circuit compares the first comparison data with second comparison data based on the control data received by the first interface circuit from the second interface circuit.

18 Claims, 15 Drawing Sheets

CONTROLLER, LIGHT SOURCE CONTROL SYSTEM, AND DISPLAY SYSTEM

The present application is based on, and claims priority from JP Application Serial Number 2024-102697, filed Jun. 26, 2024, the disclosure of which is hereby incorporated by reference herein in its entirety.

BACKGROUND

1. Technical Field

The present disclosure relates to a controller, a light source control system, a display system, and the like.

2. Related Art

WO 2022/270414 discloses a lamp controller that controls a headlamp for a vehicle. The lamp controller includes a drawing processing unit that generates multi-level light distribution image data that defines light distribution of a variable light distribution lamp, and a device interface circuit that transmits the light distribution image data to a patterning device. The patterning device includes an interface circuit that receives light distribution image data and an LED array that emits light based on the light distribution image data. The lamp controller includes a monitoring microcomputer, and the monitoring microcomputer self-diagnoses the presence or absence of an abnormality for each software process. Each of the drawing processing unit, the device interface circuit, and the patterning device has a self-diagnosis function and transmit data indicating a diagnosis result to the monitoring microcomputer.

WO 2022/270414 is an example of the related art.

In WO 2022/270414, since a diagnosis can be made only for each software process, only an individual error check on processing in the lamp controller or processing in the patterning device can be performed.

SUMMARY

An aspect of the present disclosure relates to a controller that transmits control data for controlling luminance of a light source to a light source driver that drives the light source based on the control data, and the controller includes a control data generation circuit that generates the control data based on luminance data indicating the luminance, a first interface circuit that transmits the control data to the light source driver, a first storage circuit that stores first comparison data based on the luminance data or the control data, and an error detection circuit that performs error detection using the stored first comparison data, wherein the light source driver includes a second interface circuit that receives the control data, a second storage circuit that stores the received control data, and a drive circuit that drives the light source based on the stored control data, and the first interface circuit receives the control data stored in the second storage circuit from the second interface circuit, and the error detection circuit performs error detection of the control data received from the light source driver by comparing the first comparison data with second comparison data based on the control data received from the light source driver.

Another aspect of the present disclosure relates to a light source control system including the controller and the light source driver.

Still another aspect of the present disclosure relates to a display system including the controller, the light source driver, the light source, and a display panel that a light enters from the light source.

DESCRIPTION OF EMBODIMENTS

As below, preferred embodiments of the present disclosure will be described in detail. The following embodiments do not unduly limit the description in "What is Claimed is", and not all of the configurations described in the embodiments are necessarily essential component elements.

1. Configuration Examples

Figure 1:
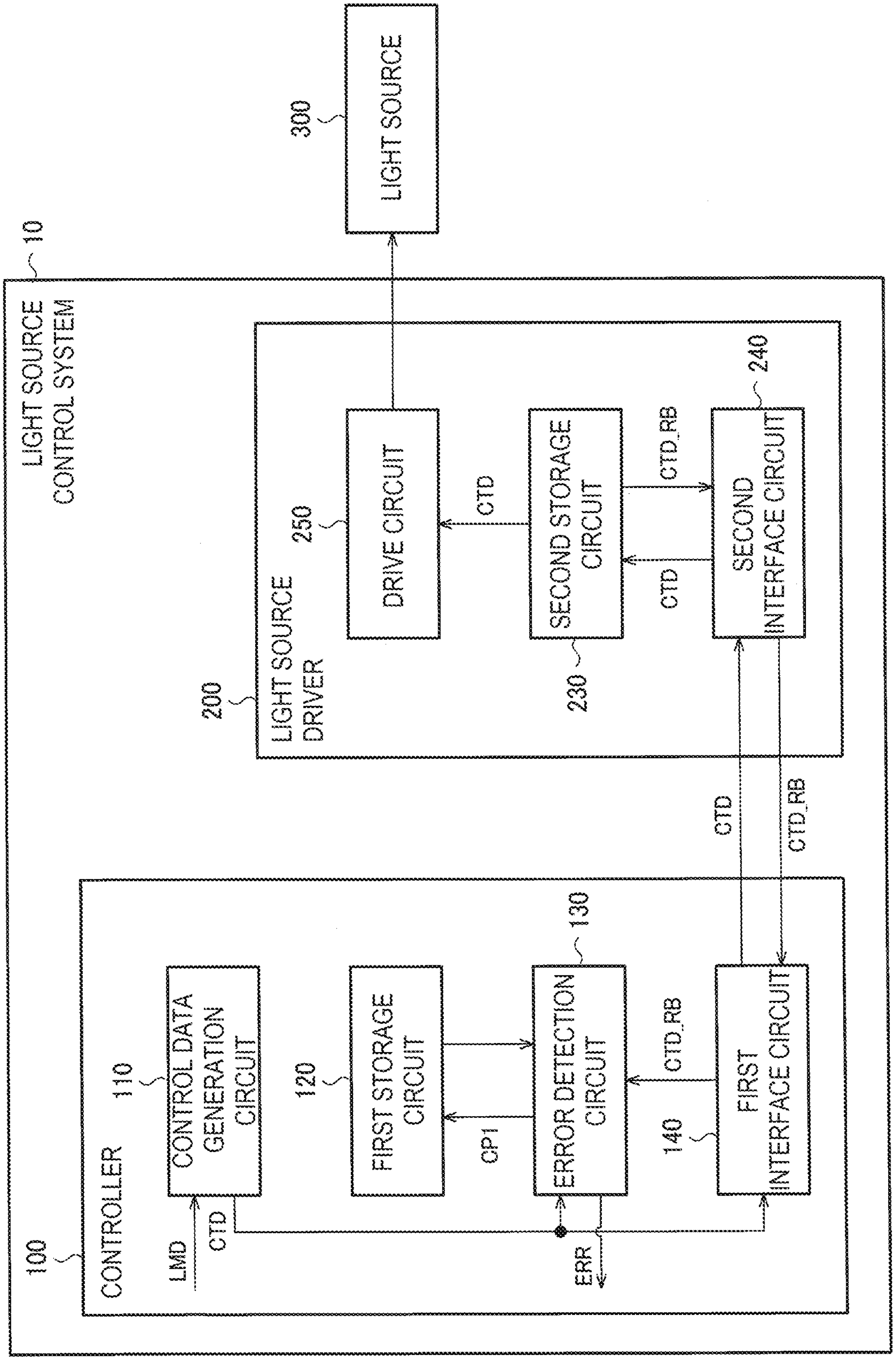
FIG. 1 shows a first configuration example of a light source control system.

FIG. 1 shows a first configuration example of a light source control system 10. The light source control system 10 is a system that controls a light source 300, and controls, for example, light emission, turn-off, and light emission luminance of the light source 300. The light source control system 10 includes a controller 100 and a light source driver 200.

The light source 300 is a light emitting element that converts electric energy into light. The light emitting element is, for example, an inorganic or organic LED. LED is an abbreviation for Light Emitting Diode. Although FIG. 1 illustrates an example in which the light source driver 200 drives one light source 300, the light source driver 200 may drive a plurality of light sources 300.

The controller 100 converts luminance data LMD indicating the luminance of the light source 300 into control data CTD for controlling the light source driver 200, and transmits the control data CTD to the light source driver 200. The controller 100 includes a control data generation circuit 110, a first storage circuit 120, an error detection circuit 130, and a first interface circuit 140. The controller 100 is, for example, an integrated circuit device in which a plurality of circuit elements are integrated on a semiconductor substrate.

The light source driver 200 drives the light source 300 based on the control data CTD received from the controller 100. The light source driver 200 includes a second interface circuit 240, a second storage circuit 230, and a drive circuit 250. The light source driver 200 is, for example, an integrated circuit device in which a plurality of circuit elements are integrated on a semiconductor substrate.

First, an operation of each unit related to driving of the light source 300 will be described. The control data generation circuit 110 converts the luminance data LMD into control data CTD. The luminance data LMD is, for example, data representing luminance with gray-scale values at a given number of levels. The luminance data LMD may be generated by, for example, a dimming processing circuit (not illustrated) built in the controller 100, or may be generated by a host device or the like and input from the outside of the controller 100. The control data CTD is data used by the light source driver 200 to control the light source 300 and, for example, PWM data or current value data, which will be described later in detail. PWM is an abbreviation for Pulse Width Modulation.

The first interface circuit 140 transmits the control data CTD to the second interface circuit 240. The second interface circuit 240 receives the control data CTD from the first interface circuit 140. Various inter-IC interface standards may be used as the interface standards for the first interface circuit 140 and the second interface circuit 240. As an example, a serial interface standard such as SPI or I2C may be adopted. SPI is an abbreviation for Serial Peripheral Interface. I2C is an abbreviation for Inter-Integrated Circuit. Alternatively, a shift register system in which serial data and a latch pulse are transmitted at the transmission side and the serial data is input to a shift register and data is determined by the latch pulse at the reception side may be adopted.

The second storage circuit 230 stores the control data CTD received by the second interface circuit 240. The second storage circuit 230 is, for example, a register by a latch circuit or the like or a semiconductor memory such as an SRAM or a DRAM.

The drive circuit 250 drives the light source 300 based on the control data CTD stored in the second storage circuit 230. When the drive circuit 250 drives the plurality of light sources 300, the control data CTD may be designated for each light source 300, the control data CTD may be designated for each unit including two or more light sources 300, or one piece of control data CTD may be designated for all of the plurality of light sources 300. As examples of the control data CTD, PWM data and current value data will be described.

The PWM data is data for PWM control of the light source 300 and, for example, data for designating an ON duration or an ON duty according to the luminance. In this case, the light source 300 and a switch are coupled in series between the power supply node and the ground node. The drive circuit 250 drives the light source 300 by controlling the switch to be on or off by a pulse signal based on the PWM data. The ON duration or the ON duty of the PWM data indicates the pulse width of the pulse signal.

The current value data is data for controlling a current value flowing through the light source 300 and data for designating the current value according to the luminance. In this case, a sense resistor, the light source 300, an inductor, and a switch are coupled in series between the power supply node and the ground node. The drive circuit 250 controls the current value flowing through the light source 300 by feedback control. Specifically, the drive circuit 250 detects the current value flowing through the light source 300 using a potential difference between ends of the sense resistor, and performs switching control of the switch such that the current value becomes a current value indicated by the current value data.

Next, an operation of each unit related to error detection will be described. The first storage circuit 120 stores first comparison data CP1 based on the control data CTD. The first comparison data CP1 is an error check code generated from the control data CTD by the error detection circuit 130 or the control data CTD itself. The first storage circuit 120 is, for example, a register by a latch circuit or the like or a semiconductor memory such as an SRAM or a DRAM.

The second interface circuit 240 reads the control data CTD from the second storage circuit 230 and transmits the data to the first interface circuit 140. The read control data is referred to as CTD_RB. The first interface circuit 140 receives the control data CTD_RB from the second interface circuit 240. As an example, the first interface circuit 140 issues a read command, and the second interface circuit 240 reads the control data CTD_RB from the second storage circuit 230 in response to the read command and transmits the data to the first interface circuit 140.

The error detection circuit 130 compares second comparison data based on the control data CTD_RB with the first comparison data CP1 stored in the first storage circuit 120. The second comparison data is the same type of data as the first comparison data CP1, and is an error check code generated from the control data CTD_RB by the error detection circuit 130 or the control data CTD_RB itself. The error detection circuit 130 determines that there is no error when the first comparison data CP1 and the second comparison data match, and determines that there is an error when the first comparison data CP1 and the second comparison data do not match. The error detection circuit 130 outputs a result of the error detection as an error signal ERR. The error signal ERR is also referred to as an error flag.

Figure 2:
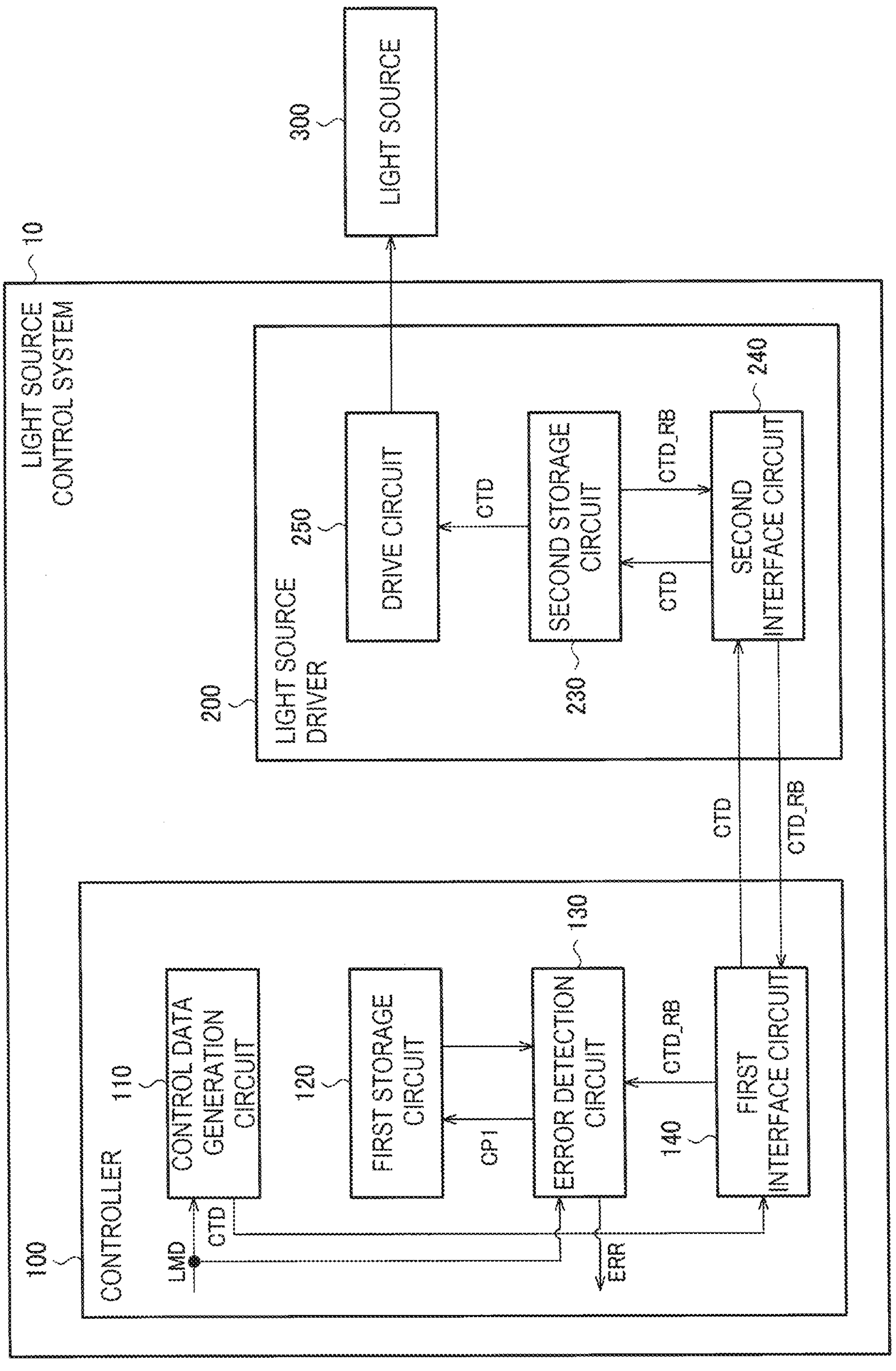
FIG. 2 shows a second configuration example of the light source control system.

FIG. 2 shows a second configuration example of the light source control system 10. The operation of each unit related to the driving of the light source 300 is the same as that in FIG. 1. The operation of each unit related to the error detection will be described focusing on differences from that in FIG. 1.

The first storage circuit 120 stores first comparison data CP1 based on the luminance data LMD. The first comparison data CP1 is an error check code generated from the luminance data LMD by the error detection circuit 130 or the luminance data LMD itself.

The error detection circuit 130 compares second comparison data based on the control data CTD_RB with the first comparison data CP1 stored in the first storage circuit 120. The second comparison data is the same type of data as the first comparison data CP1, and is an error check code generated by the error detection circuit 130 from luminance data obtained by converting the control data CTD_RB or the luminance data itself.

In the embodiment, the controller 100 transmits the control data CTD to the light source driver 200 that drives the light source 300 based on the control data CTD for controlling the luminance of the light source 300. The controller 100 includes the control data generation circuit 110 that generates the control data CTD based on the luminance data LMD indicating the luminance, and the first interface circuit 140 that transmits the control data CTD to the light source driver 200. The controller 100 includes the first storage circuit 120 that s t stores the first comparison data CP1 based on the luminance data LMD or the control data CTD, and the error detection circuit 130 that performs error detection using the stored first comparison data CP1. The light source driver 200 includes the second interface circuit 240 that receives the control data CTD, the second storage circuit 230 that stores the received control data CTD, and the drive circuit 250 that drives the light source 300 based on the stored control data CTD. The first interface circuit 140 receives the control data CTD stored in the second storage circuit 230 from the second interface circuit 240. The error detection circuit 130 performs error detection of the control data CTD_RB received from the light source driver 200 by comparing the first comparison data CP1 with the second comparison data based on the control data CTD_RB received from the light source driver 200.

According to the embodiment, the controller 100 can execute error detection for the entire processing route of the controller 100 and the light source driver 200 instead of error detection for the controller 100 alone or the light source driver 200 alone. For example, an operation abnormality in each circuit of the control data generation circuit 110, the first interface circuit 140, the second interface circuit 240, and the second storage circuit 230, a disconnection in each circuit or between circuits, or a communication abnormality between circuits can be detected as an error.

When the data transmitted from the controller 100 is subjected to an error check in the light source driver 200, it is necessary for the controller 100 to calculate an expected value according to an arithmetic expression of an error check code in the light source driver 200 and transmit the expected value to the light source driver 200. According to the embodiment, by reading the control data CTD from the light source driver 200 and performing error detection in the controller 100, it is not necessary to consider the arithmetic expression of the error check code in the light source driver 200. Accordingly, the specification of the error detection can be freely adopted.

The error detection of the embodiment may be either software processing or hardware processing. When hardware processing is used, the design can be made simpler or the processing can be made faster compared to software processing. The software processing here refers to processing for implementing a function by a program using a general-purpose microcomputer or the like. Further, the hardware processing here refers to processing for implementing a function by hardware that is exclusively designed for implementing a function by a circuit configuration of the hardware itself. In the software processing, it is necessary to rewrite the program according to the specification of the adopted light source driver 200. On the other hand, in the hardware processing, for example, the interface standard of the first interface circuit 140 may be matched with the specification of the light source driver 200 by register setting or the like, and there is little design change such as rewriting of a program. When hardware processing and software processing for implementing the same function are compared, the hardware processing is usually faster. The hardware processing is adopted, and thus high-speed error detection can be performed, and for example, error detection can be performed for each frame.

In the embodiment, the first comparison data CP1 and the second comparison data may be the error check code generated from the control data CTD, the error check code generated from the luminance data LMD, the control data CTD, or the luminance data LMD.

According to the embodiment, since the specification of the error detection can be freely adopted, the error detection can be performed using various error check codes and data as described above as necessary. The standard of the error check code can also be variously selected from CRC, checksum, parity check, and the like.

In the embodiment, the control data CTD may be PWM data indicating a pulse width of a pulse signal for driving the light source 300 or current value data indicating a current value for driving the light source 300.

According to the embodiment, the controller 100 can detect whether the PWM data or the current value data stored in the second storage circuit 230 of the light source driver 200 matches the PWM data or the current value data transmitted by the controller 100. Accordingly, whether the light source 300 is driven by the correct PWM data or current value data can be checked.

2. Detailed Configuration Examples

Figure 3:
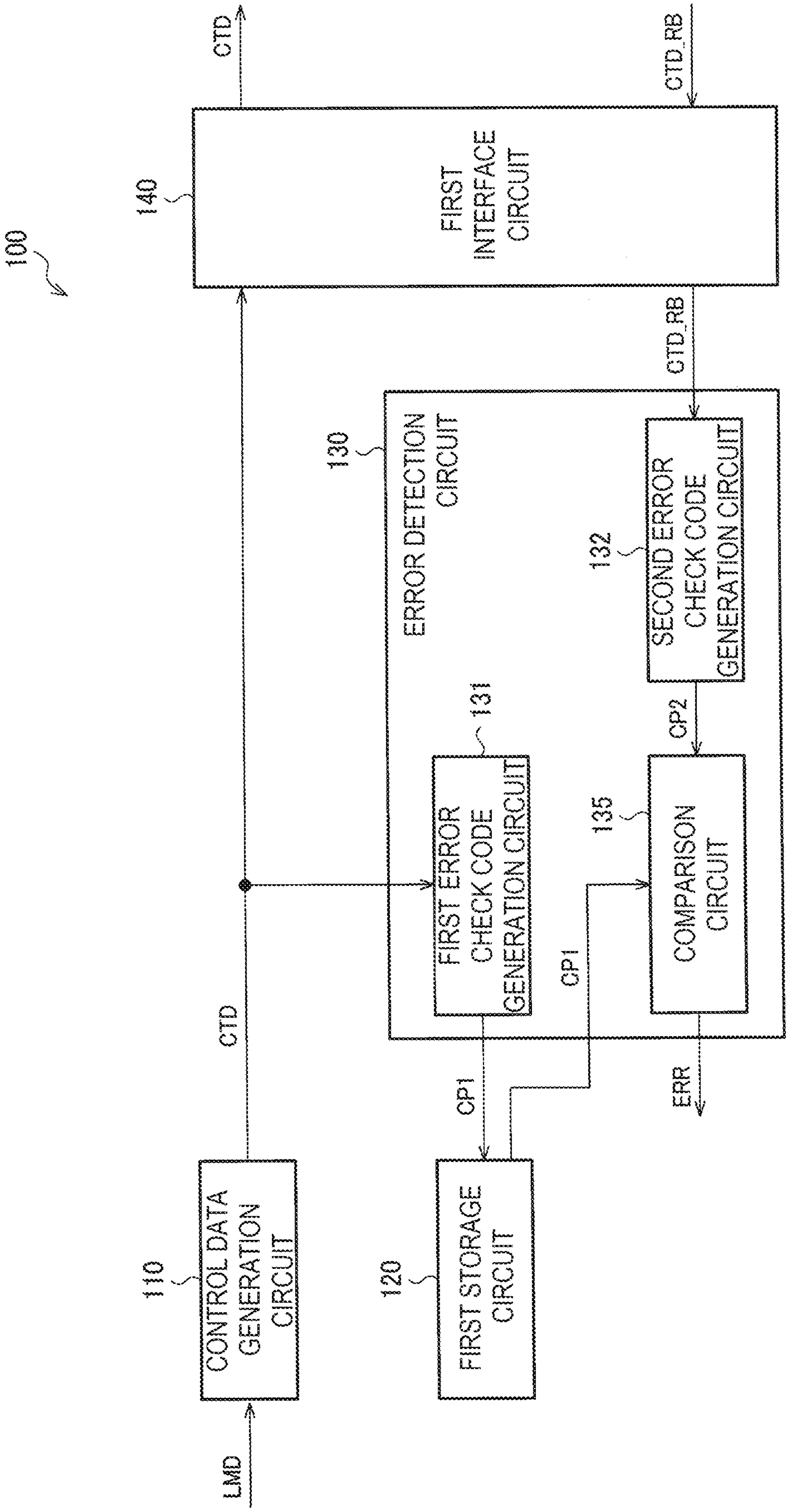
FIG. 3 shows a first detailed configuration example of a controller.

FIG. 3 shows a first detailed configuration example of the controller 100. In the configuration example, the error detection circuit 130 includes a first error check code generation circuit 131, a second error check code generation circuit 132, and a comparison circuit 135.

The first error check code generation circuit 131 converts the control data CTD into an error check code, and stores the error check code in the first storage circuit 120 as first comparison data CP1. The error check code may be a code used in various error check methods such as CRC, checksum, or parity code. CRC is an abbreviation for Cyclic Redundancy Check. The first error check code generation circuit 131 may convert each control data CTD corresponding to one light source into first comparison data CP1, or may collectively convert the control data CTD corresponding to a plurality of light sources into one piece of first comparison data CP1.

The second error check code generation circuit 132 converts the control data CTD_RB into an error check code, and outputs the error check code to the comparison circuit 135 as second comparison data CP2. The second error check code generation circuit 132 generates the second comparison data CP2 using the same algorithm as the conversion algorithm used by the first error check code generation circuit 131.

The comparison circuit 135 compares the first comparison data CP1 stored in the first storage circuit 120 with the second comparison data CP2 from the second error check code generation circuit 132, and outputs the result as an error signal ERR.

The light emission luminance of the light source 300 is updated, for example, for each frame. Concurrently, the error detection circuit 130 performs error detection on each frame. That is, the error detection circuit 130 generates the first comparison data CP1 and the second comparison data CP2 corresponding to the control data CTD of each frame, and compares the comparison data. The frame here may be a frame in light source control, or may be a display frame in a case where a light source is used for a backlight of a display device or the like.

Figure 4:
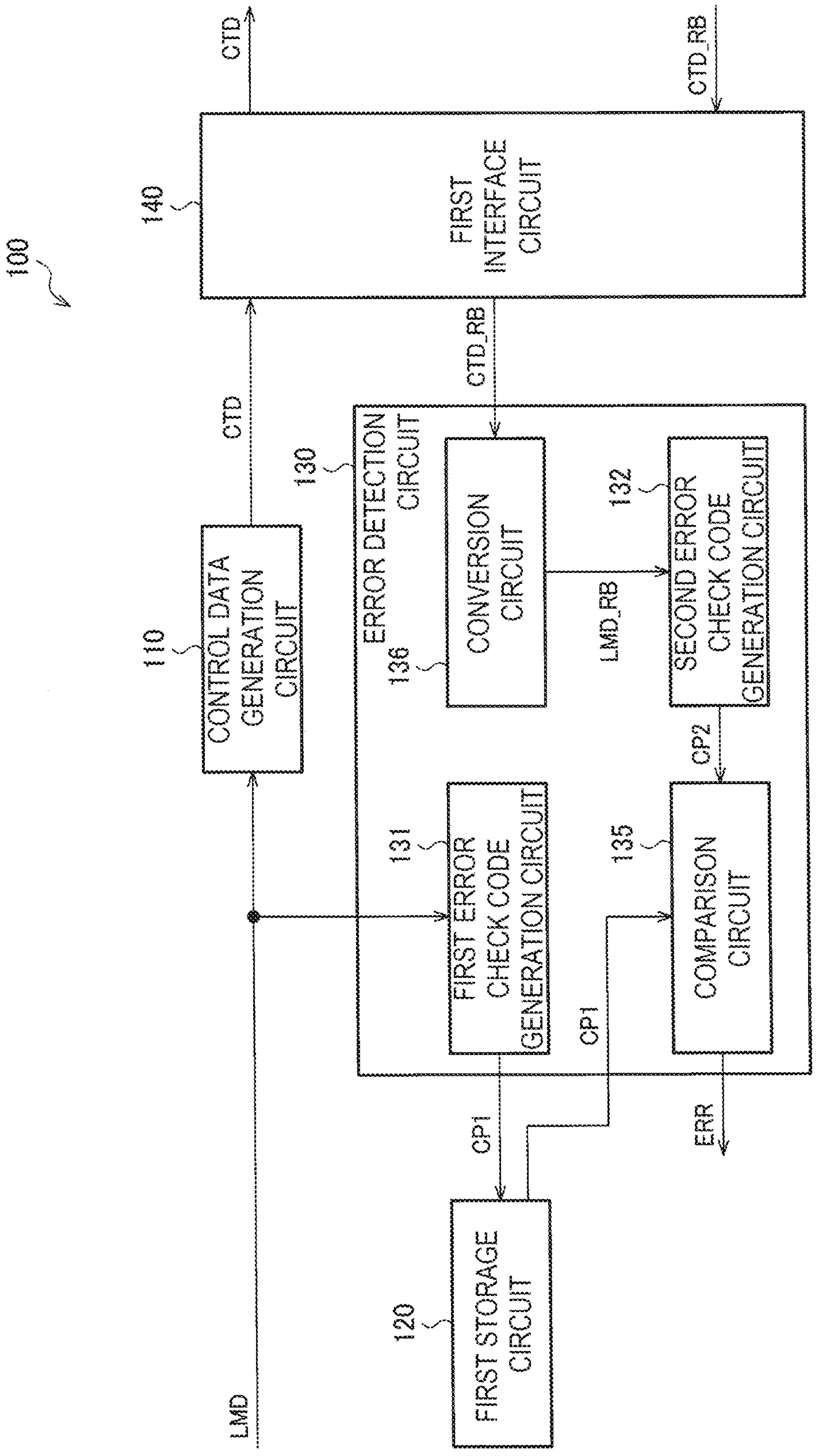
FIG. 4 shows a second detailed configuration example of the controller.

FIG. 4 shows a second detailed configuration example of the controller 100. In the configuration example, the error detection circuit 130 includes a first error check code generation circuit 131, a second error check code generation circuit 132, a comparison circuit 135, and a conversion circuit 136. As below, differences from FIG. 3 will be described.

The first error check code generation circuit 131 converts the luminance data LMD into an error check code, and stores the error check code in the first storage circuit 120 as first comparison data CP1.

The conversion circuit 136 converts the control data CTD_RB into luminance data LMD_RB. The conversion circuit 136 generates the luminance data LMD_RB by inverse conversion of the conversion performed by the control data generation circuit 110. For example, when the control data generation circuit 110 performs conversion such that the luminance data LMD and the control data CTD uniquely correspond to each other, the conversion circuit 136 can inversely convert the control data CTD_RB into the luminance data LMD_RB.

The second error check code generation circuit 132 converts the luminance data LMD_RB into an error check code, and outputs the error check code to the comparison circuit 135 as second comparison data CP2.

Figure 5:
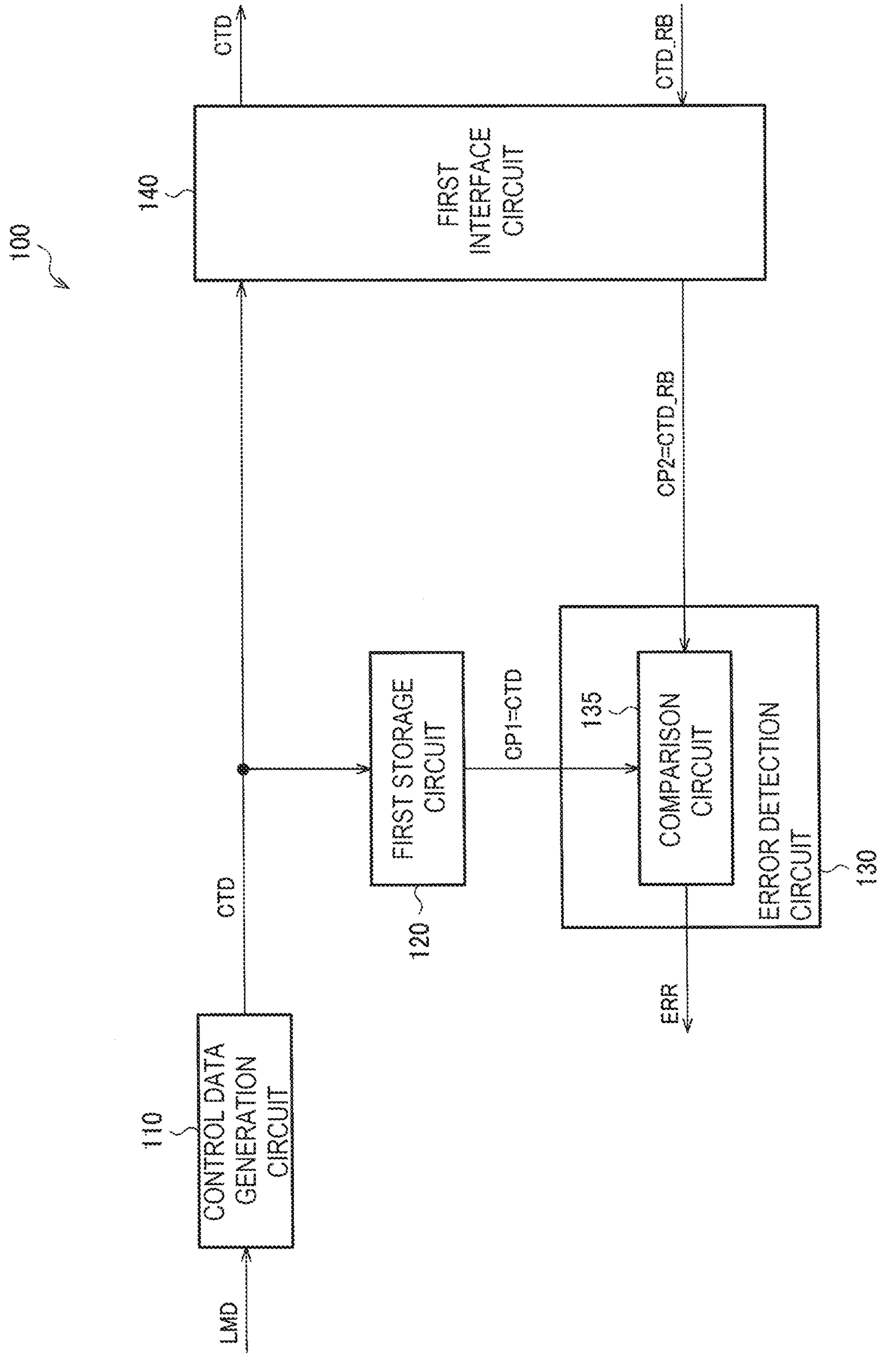
FIG. 5 shows a third detailed configuration example of the controller.

FIG. 5 shows a third detailed configuration example of the controller 100. In the configuration example, the error detection circuit 130 includes a comparison circuit 135. As below, differences from FIGS. 3 and 4 will be described.

To the comparison circuit 135, the control data CTD stored in the first storage circuit 120 is input as the first comparison data CP1, and the control data CTD_RB received by the first interface circuit 140 is input as the second comparison data CP2. The comparison circuit 135 compares the input first comparison data CP1 and second comparison data CP2, and outputs the result as an error signal ERR.

Figure 6:
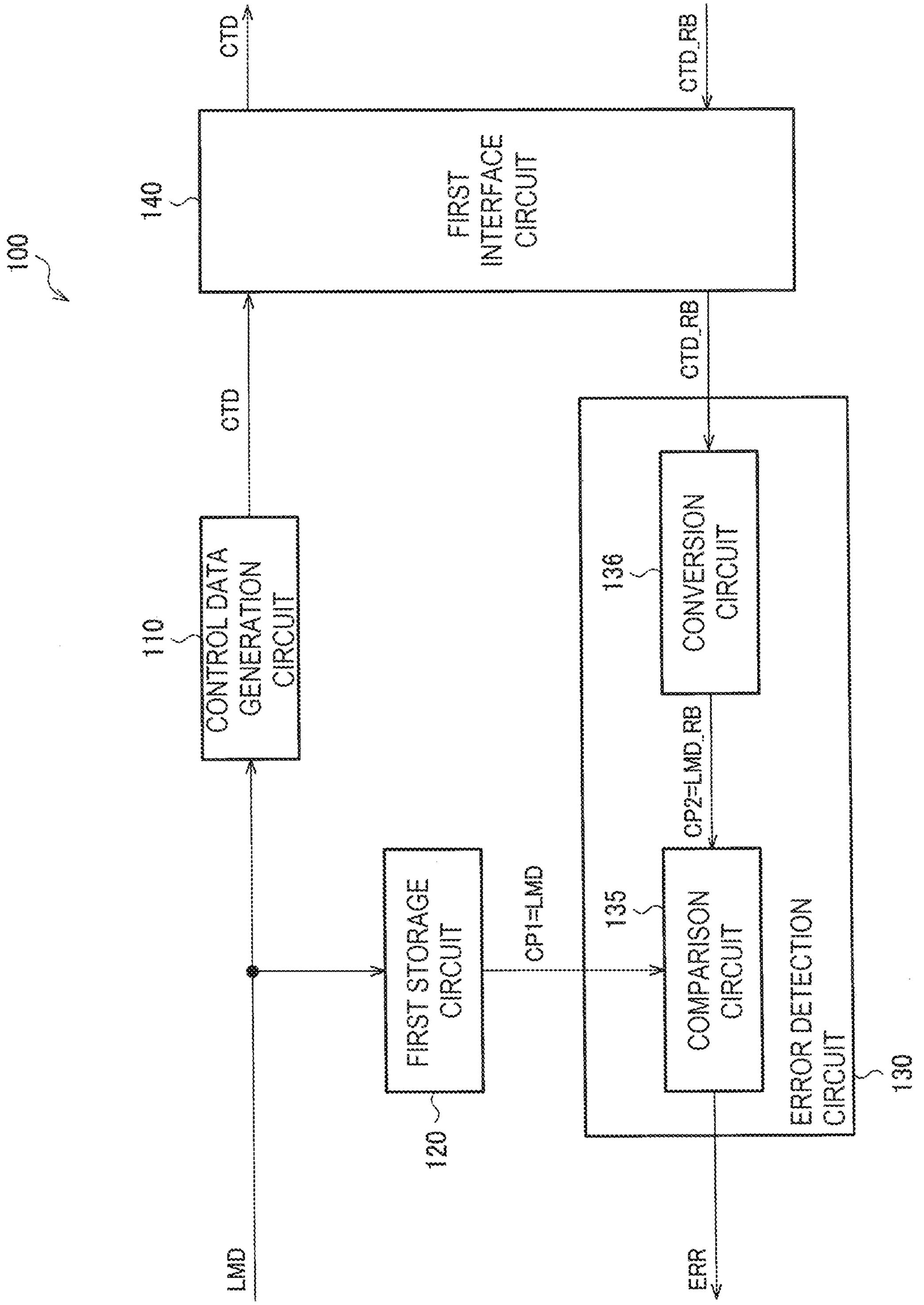
FIG. 6 shows a fourth detailed configuration example of the controller.

FIG. 6 shows a fourth detailed configuration example of the controller 100. In the configuration example, the error detection circuit 130 includes a comparison circuit 135 and a conversion circuit 136. As below, differences from FIGS. 3 to 5 will be described.

To the comparison circuit 135, the luminance data LMD stored in the first storage circuit 120 is input as the first comparison data CP1, and the luminance data LMD_RB from the conversion circuit 136 is input as the second comparison data CP2. The comparison circuit 135 compares the input first comparison data CP1 and second comparison data CP2, and outputs the result as an error signal ERR.

Figure 7:
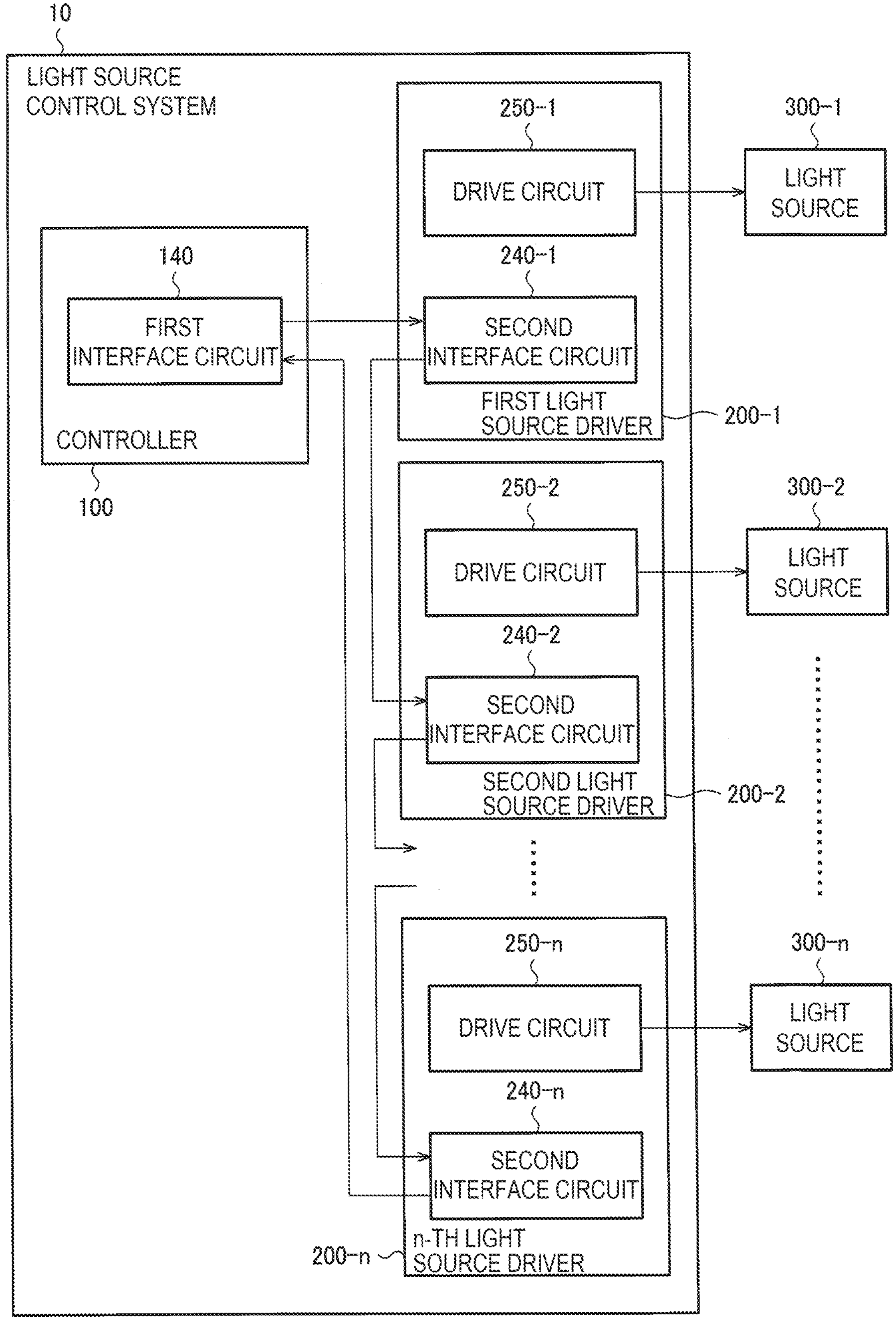
FIG. 7 shows a detailed configuration example of a light source control system when the controller controls a plurality of light source drivers.

FIG. 7 shows a detailed configuration example of the light source control system 10 when the controller 100 controls a plurality of light source drivers. The light source control system 10 includes a controller 100 and first to n-th light source drivers 200-1 to 200-*n*. The n is an integer of 2 or more. In FIG. 7, the control data generation circuit, the first storage circuit, and the error detection circuit of the controller 100 and the second storage circuit of each light source driver are not illustrated.

A second interface circuit 240-1 of the first light source driver 200-1, a second interface circuit 240-2 of the second light source driver 200-2, . . . , and a second interface circuit 240-*n* of the n-th light source driver 200-*n* are coupled in series to the first interface circuit 140 of the controller 100 in daisy chain. The daisy chain is a communication connection in which data is sequentially transferred to the first light source driver 200-1 to the n-th light source driver 200-*n* according to an interface standard such as SPI.

The coupling between the controller 100 and the respective light source drivers is not limited to the daisy chain. For example, the second interface circuits 240-1 to 240-*n* may be communicatively connected in parallel to one communication port of the first interface circuit 140. Alternatively, the first interface circuit 140 may have n communication ports, and the second interface circuit of one light source driver may be communicatively connected to one communication port.

A drive circuit 250-1 of the first light source driver 200-1 drives a light source 300-1 based on the control data received by the second interface circuit 240-1. Similarly, a drive circuit 250-2 of the second light source driver 200-2 drives a light source 300-2 based on the control data received by the second interface circuit 240-2, . . . , and a drive circuit 250-*n* of the n-th light source driver 200-*n* drives a light source 300-*n* based on the control data received by the second interface circuit 240-*n*.

Figure 8:
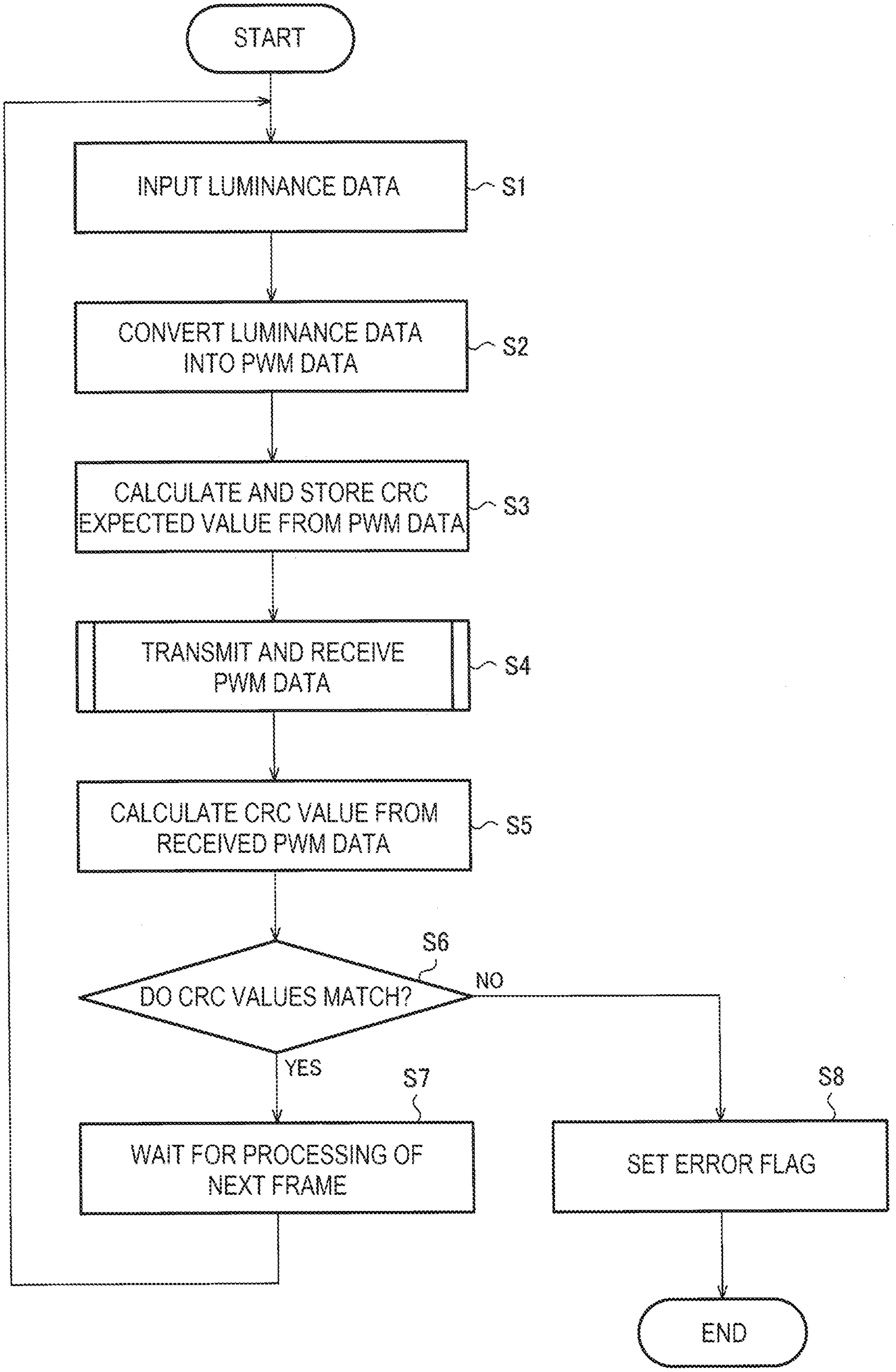
FIG. 8 shows an example of a processing flow of the controller when the plurality of light source drivers are provided.
Figure 9:
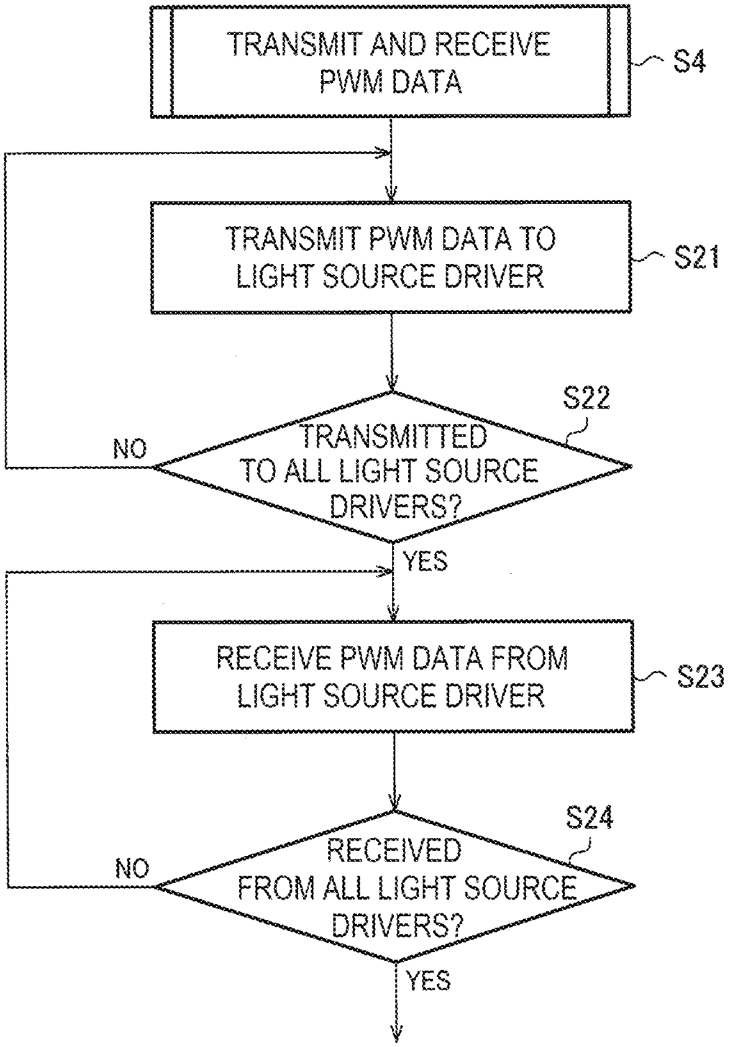
FIG. 9 shows an example of the processing flow of the controller when the plurality of light source drivers are provided.
Figure 10:
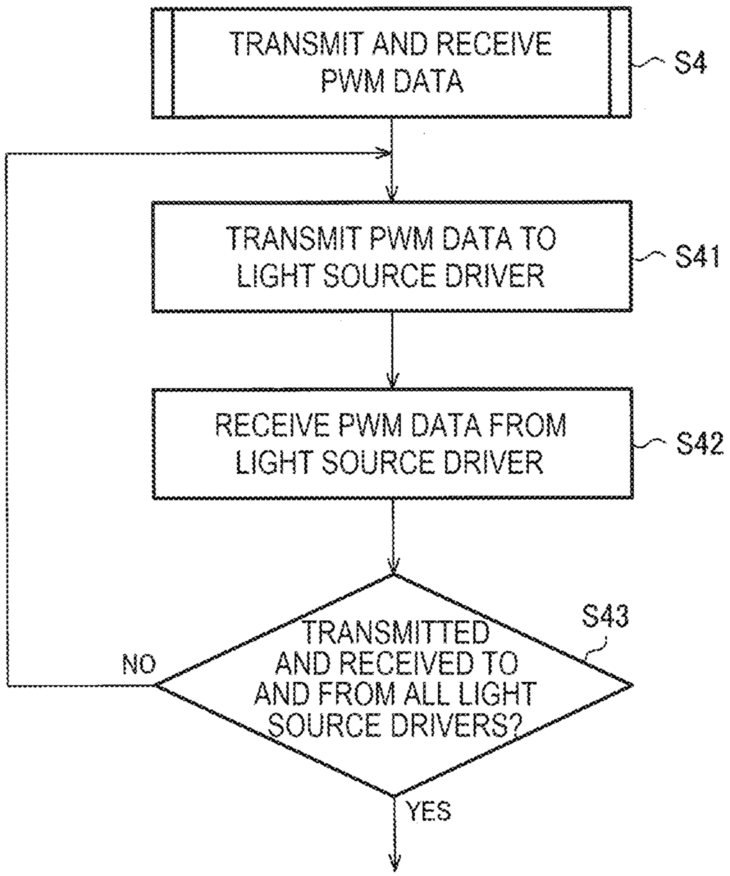
FIG. 10 shows an example of the processing flow of the controller when the plurality of light source drivers are provided.

FIGS. 8 to 10 are processing flow examples of the controller 100 when a plurality of light source drivers are provided as shown in FIG. 7. Here, examples in which the control data CTD is PWM data and the first comparison data CP1 and the second comparison data CP2 are CRC values are shown.

In step S1, the luminance data LMD is input to the control data generation circuit 110. In step S2, the control data generation circuit 110 converts the luminance data LMD into PWM data. In step S3, the first error check code generation circuit 131 calculates a CRC expected value from the PWM data and stores the CRC expected value in the first storage circuit 120. In step S4, the first interface circuit 140 transmits and receives PWM data to and from the first light source driver 200-1 to the n-th light source driver 200-*n*. The details of S4 will be described with reference to FIGS. 9 and 10. Note that S3 and S4 may be executed in parallel.

In step S5, the second error check code generation circuit 132 calculates a CRC value from the PWM data received in step S4. In step S6, the comparison circuit 135 determines whether the CRC expected value stored in the first storage circuit 120 in step S3 matches the CRC value calculated in step S5. In step S6, when a determination that the CRC expected value and the CRC value match each other is made, in step S7, the controller 100 waits for the processing of the next frame and executes the processing from S1 after the start of the processing of the next frame. In step S6, when a determination that the CRC expected value does not match the CRC value is made, in step S8, the comparison circuit 135 sets an error flag and outputs an error signal ERR in response to the error flag.

FIG. 9 shows a first detailed flow example of step S4. In step S21, the first interface circuit 140 transmits the PWM data to the second interface circuit of one light source driver among the first light source driver 200-1 to the n-th light source driver 200-*n*. In step S22, the first: interface circuit 140 determines whether to transmit the PWM data to all the light source drivers. In step S22, when determining that there remains the light source driver to which the PWM data is not yet transmitted, the first interface circuit 140 returns to step S21 and transmits the PWM data to the second interface circuit of one of the remaining light source drivers. In step S22, when determining that the PWM data is transmitted to all the light source drivers, the first interface circuit 140 goes to step S23.

In step S23, the first interface circuit 140 receives the PWM data from the second interface circuit of one light source driver among the first light source driver 200-1 to the n-th light source driver 200-*n*. In step S24, the first interface circuit 140 determines whether the PWM data is received from all the light source drivers. In step S24, when determining that there remains the light source driver from which the PWM data is not received, the first interface circuit 140 returns to step S23 and receives the PWM data from the second interface circuit of one of the remaining light source drivers. In step S24, when determining that the PWM data is received from all the light source drivers, the first interface circuit 140 goes to step S5.

FIG. 10 shows a second detailed flow example of step S4. In step S41, the first interface circuit 140 transmits the PWM data to the second interface circuit of one light source driver among the first light source driver 200-1 to the n-th light source driver 200-*n*. In step S42, the first interface circuit 140 receives the PWM data from the second interface circuit of the light source driver that transmits the PWM data in step S41.

In step S43, the first interface circuit 140 determines whether the PWM data is transmitted and received to and from all the light source drivers. In step S43, when determining that there remains the light source driver to which the PWM data is not transmitted and from which the PWM data is not received, the first interface circuit 140 returns to step S41 and transmits the PWM data to the second interface circuit of one of the remaining light source drivers. In step S43, when determining that the PWM data is transmitted and received to and from all the light source drivers, the first interface circuit 140 goes to step S5.

Figure 11:
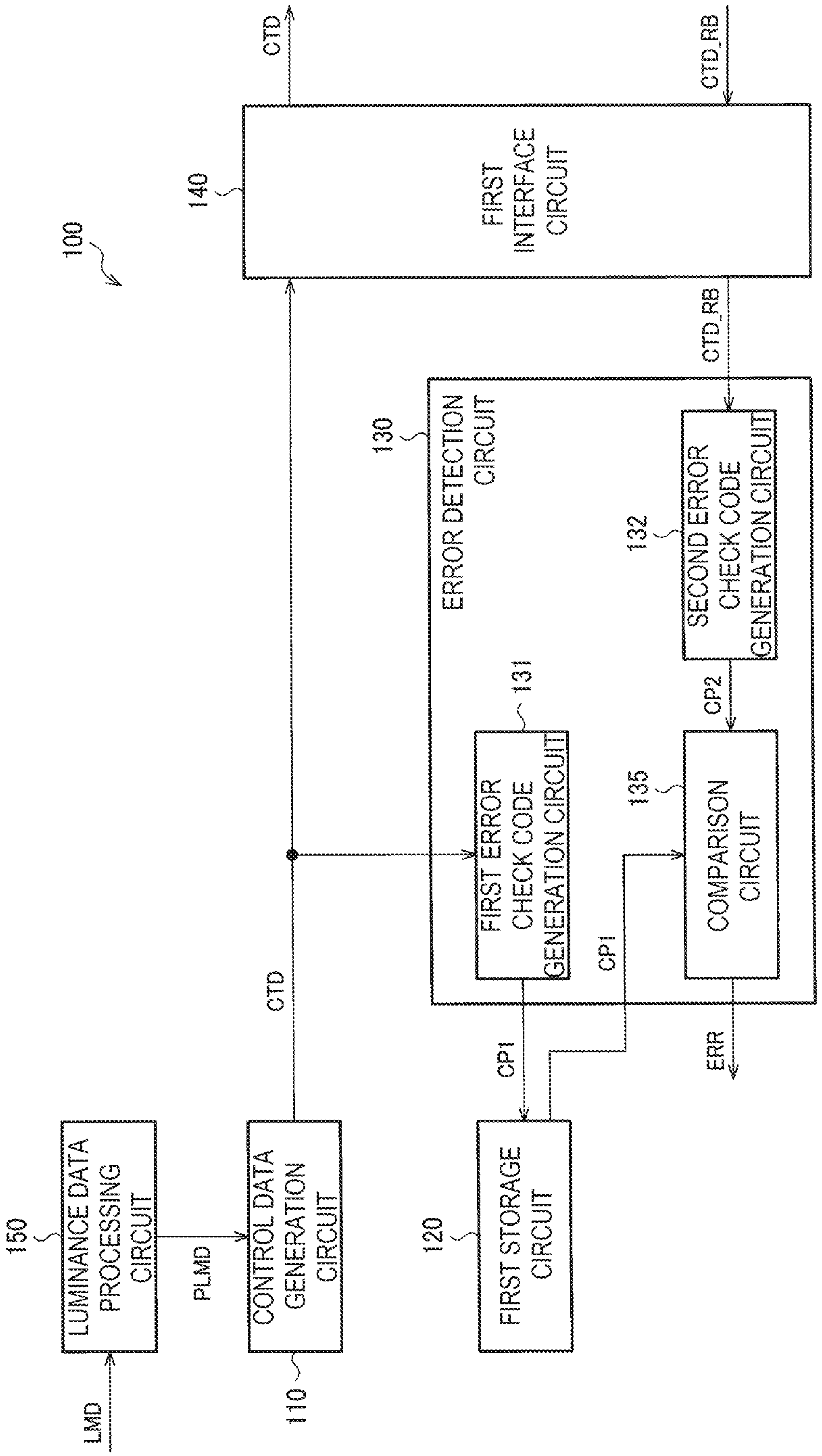
FIG. 11 shows a first detailed configuration example of the controller when a freeze error check is performed.

FIG. 11 shows a first detailed configuration example of the controller 100 when a freeze error check is performed. Differences from FIG. 3 will be mainly described. The controller 100 further includes a luminance data processing circuit 150. Due to communication errors in the first interface circuit 140 or write errors in the second memory circuit 230, the previously transmitted control data CTD may be continuously output to the drive circuit 250. The failure to update the control data CTD_RB stored in the second memory circuit 230 is referred to as a freeze error.

The luminance data processing circuit 150 performs processing of adding a temporal slight fluctuation to the luminance data LMD, and outputs the result as processed luminance data PLMD. That is, the luminance data processing circuit 150 sets the processed luminance data PLMD to temporally slightly fluctuate even when the luminance data LMD does not change. Specifically, the luminance data processing circuit 150 performs processing of changing a predetermined bit of the luminance data LMD at predetermined time intervals. The predetermined bit is LSB, but not limited to this and may be two or more bits or may not be the least significant bit. LSB is an abbreviation for Least Significant Bit.

The control data generation circuit 110 converts the processed luminance data PLMD into control data CTD, and the first interface circuit 140 transmits the control data CTD to the second interface circuit 240 of the light source driver 200. The first error check code generation circuit 131 calculates an error check code from the control data CTD and stores the error check code in the first storage circuit 120 as first comparison data CP1. The second interface circuit 240 transmits the control data CTD stored in the second storage circuit 230 to the first interface circuit 140 as CTD_RB. The second error check code generation circuit 132 calculates an error check code from the control data CTD_RB and outputs the error check code as second comparison data CP2. The comparison circuit 135 compares the first comparison data CP1 with the second comparison data CP2.

Figure 12:
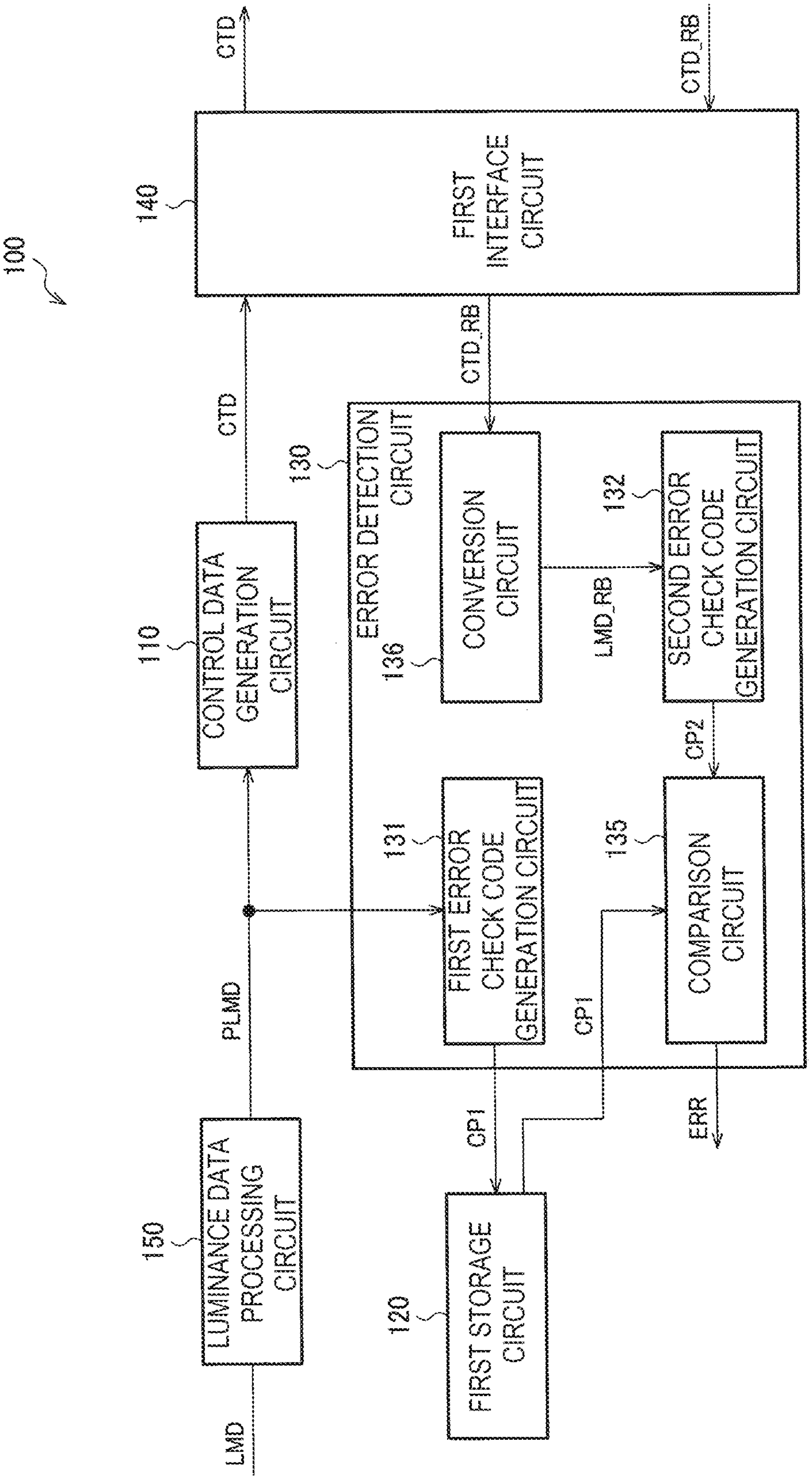
FIG. 12 shows a second detailed configuration example of the controller when the freeze error check is performed.

FIG. 12 is a second detailed configuration example of the controller 100 when the freeze error check is performed. Differences from FIG. 4 will be mainly described. The controller 100 further includes a luminance data processing circuit 150.

The operation of the luminance data processing circuit 150 and the operation until the first interface circuit 140 receives the control data CTD_RB are the same as those in FIG. 11. The first error check code generation circuit 131 calculates an error check code from the processed luminance data PLMD, and stores the error check code in the first storage circuit 120 as first comparison data CP1. The conversion circuit 136 converts the control data CTD_RB into luminance data LMD_RB. When there is no error, the luminance data LMD_RB matches the processed luminance data PLMD. The second error check code generation circuit 132 calculates an error check code from the luminance data LMD_RB and outputs the error check code as second comparison data CP2. The comparison circuit 135 compares the first comparison data CP1 with the second comparison data CP2.

The luminance data processing circuit 150 can also be applied to the configuration example in FIG. 5 or 6. When the circuit is applied to FIG. 5, the processed luminance data PLMD is input to the control data generation circuit 110. The first comparison data CP1 is control data CTD generated from the processed luminance data PLMD. When the circuit is applied to FIG. 6, the processed luminance data PLMD is input to the control data generation circuit 110 and the first storage circuit 120. The first comparison data CP1 is the processed luminance data PLMD.

Figure 13:
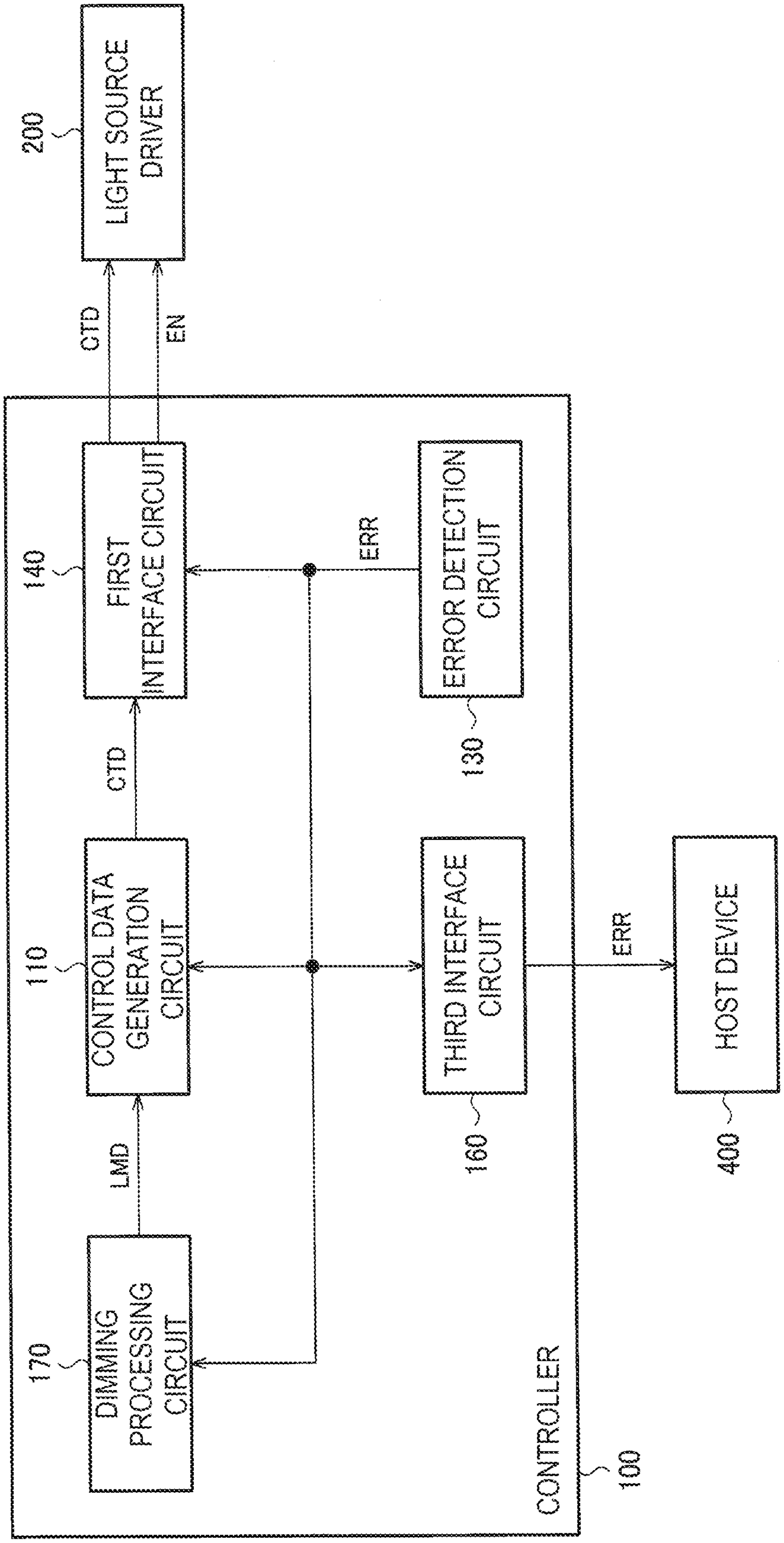
FIG. 13 shows a configuration example of the controller for explaining an operation of a controller 100 when an error is detected.

FIG. 13 shows a configuration example of the controller 100 for explaining the operation of the controller 100 when an error is detected. The controller 100 may include a dimming processing circuit 170. The controller 100 may include a third interface circuit 160. An active error signal ERR refers to an error signal ERR indicating that an error is detected. Four operation examples will be described below, but any one, any two, or any three of the four operation examples may be implemented.

When an active error signal ERR is input, the control data generation circuit 110 generates control data CTD for turning off the light source 300. That is, the control data generation circuit 110 generates the control data CTD for setting the luminance of the light source 300 to zero regardless of the luminance indicated by the luminance data LMD. For example, PWM data having an on-time of zero or current value data having a current value of zero is generated. Accordingly, the light source 300 is turned off when an error is detected.

The dimming processing circuit 170 generates luminance data LMD by dimming processing. The dimming processing is, for example, local dimming processing based on image data or dimming processing based on output of an outside light sensor. When an active error signal ERR is input, the dimming processing circuit 170 stops the dimming processing and outputs luminance data LMD having a given value. The luminance data LMD having a given value may be, for example, luminance data for continuously turning on the light source 300 at fixed luminance, or may be luminance data indicating luminance of zero. Accordingly, the light source 300 is turned on or off at fixed luminance when an error is detected.

When an active error signal ERR is input, the first interface circuit 140 transmits a signal EN for turning off the driving of the light source 300 by the light source driver 200 to the light source driver 200. The signal EN may be received by the second interface circuit 240 of the light source driver 200 or may be received by terminal input to the light source driver 200. The drive circuit 250 of the light source driver 200 stops driving in response to the signal EN, and the light source 300 is turned off. Accordingly, the light source 300 is turned off when an error is detected.

The third interface circuit 160 communicates with a host device 400 of the controller 100. For example, the host device 400 performs operation setting of the controller 100, transmits the luminance data LMD to the controller 100 when the host device 400 performs dimming, or transmits image data to the controller 100 when the controller local dimming processing of a display device. For example, the host device 400 is a processor such as a microcomputer or an CPU. When an active error signal ERR is input, the third interface circuit 160 may transmit the error signal ERR to the host device 400. Various transmission methods may be used and, for example, the error signal ERR may be transmitted via SPI or I2C or may be transmitted for pin input of an interrupt signal or the like. When receiving the active error signal ERR, the host device 400 performs processing when an error occurs. For example, the host device 400 may control the controller 100 or the light source driver 200 to turn off the light source 300 or turn on the light source at fixed luminance, or may stop the processing of transmitting the luminance data, the image data, or the like to the controller 100.

Figure 14:
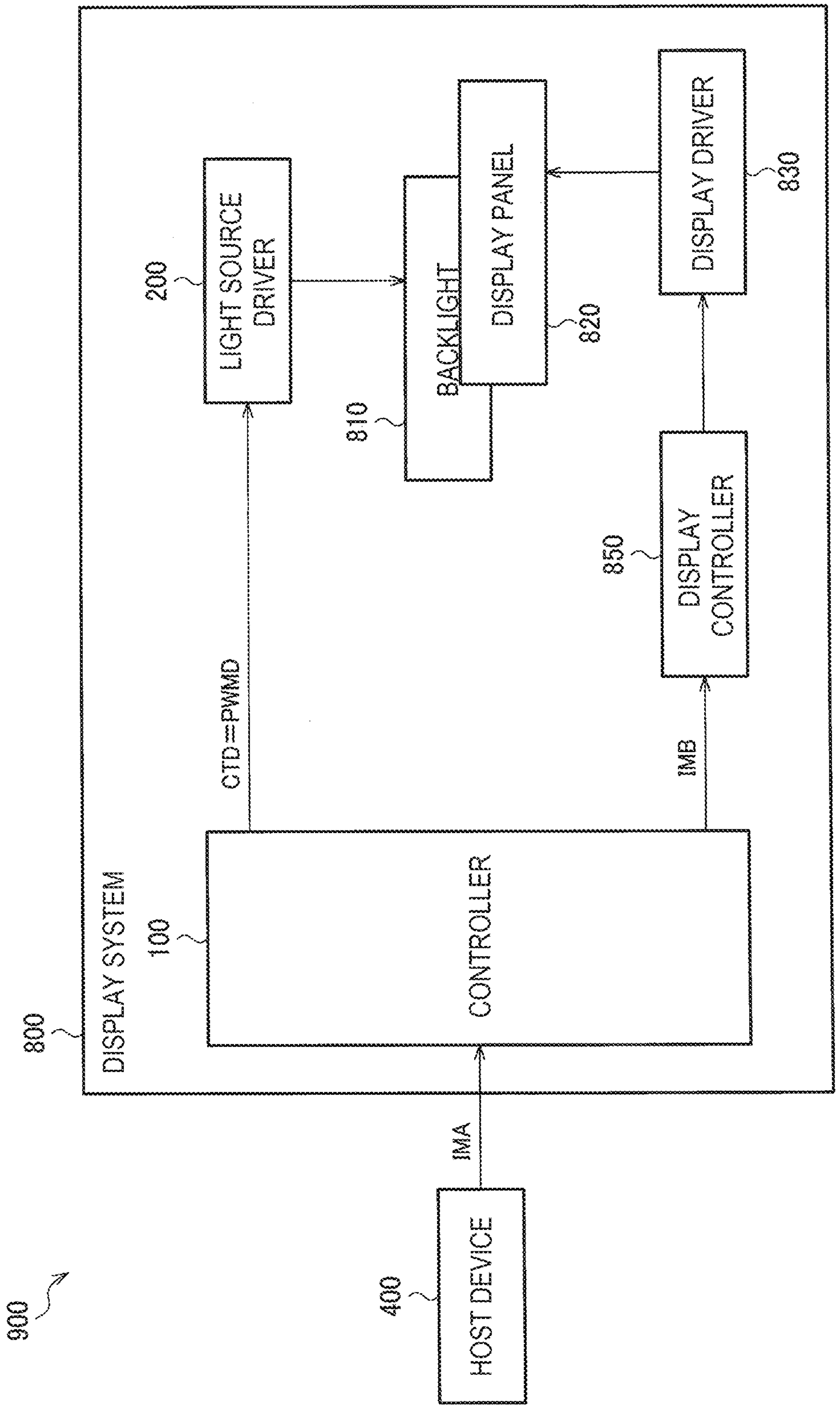
FIG. 14 shows a configuration example of an electronic apparatus as an example of a case where the controller performs local dimming processing.

FIG. 14 shows a configuration example of an electronic apparatus 900 as an example of a case where the controller 100 performs local dimming processing. The electronic apparatus 900 includes a host device 400 and a display system 800. The electronic apparatus 900 is, for example, an in-vehicle display apparatus, a television apparatus, a head-mounted display, or an information processing apparatus including a display. The in-vehicle display apparatus includes a meter panel, a center information display, a head-up display, an electronic mirror, or the like.

The display system 800 includes a controller 100, a light source driver 200, a backlight 810, a display panel 820, a display driver 830, and a display controller 850. The controller 100 and the light source driver 200 correspond to the light source control system 10 in FIG. 1, 2, or 7. A light source provided in the backlight 810 corresponds to the light source 300 in FIG. 1 or 2 or the light sources 300-1 to **300-*n* in FIG. 7**.

In a plan view with respect to the backlight 810, light sources are two-dimensionally arranged in the backlight 810. In local dimming processing, amounts of light of the two-dimensionally arranged respective light sources are controlled independently of one another. An example of the two-dimensional arrangement of the light sources is a matrix arrangement in which the light sources are arranged at all intersections of a plurality of rows and a plurality of columns. However, the two-dimensional arrangement is not limited to the matrix arrangement. For example, the two-dimensional arrangement may be an arrangement called a rhomboid arrangement or a zigzag arrangement.

The light source driver 200 receives PWM data PWMD from the controller 100 as control data CTD, and drives each light source of the backlight 810 based on the PWM data PWMD. A plurality of light source drivers may be provided as illustrated in FIG. 7.

The display panel 820 is an electro-optical panel that transmits the light from the backlight 810 and displays an image by controlling transmittance thereof. For example, the display panel 820 is a liquid crystal display panel.

The display controller 850 receives image data IMB from the controller 100, and transmits the image data IMB and a timing control signal for controlling display timing to the display driver 830. The display controller 850 may perform image processing such as tone correction, white balance correction, or enlargement and reduction on the received image data IMB.

The display driver 830 displays an image on the display panel 820 by driving the display panel 820 based on the received image data and timing control signal.

The host device 400 transmits image data IMA to the controller 100. The controller 100 receives the image data IMA and performs local dimming processing of the backlight 810 based on the image data IMA. The controller 100 adjusts the light emission luminance of each light source of the backlight 810 according to the brightness of the image data IMA, converts the luminance data LMD obtained by the adjustment into PWM data PWMD, and outputs the PWM data PWMD to the light source driver 200. Further, the controller 100 performs color correction on the image data IMA based on the luminance data LMD, and outputs image data IMB after the color correction to the display controller 850.

Figure 15:
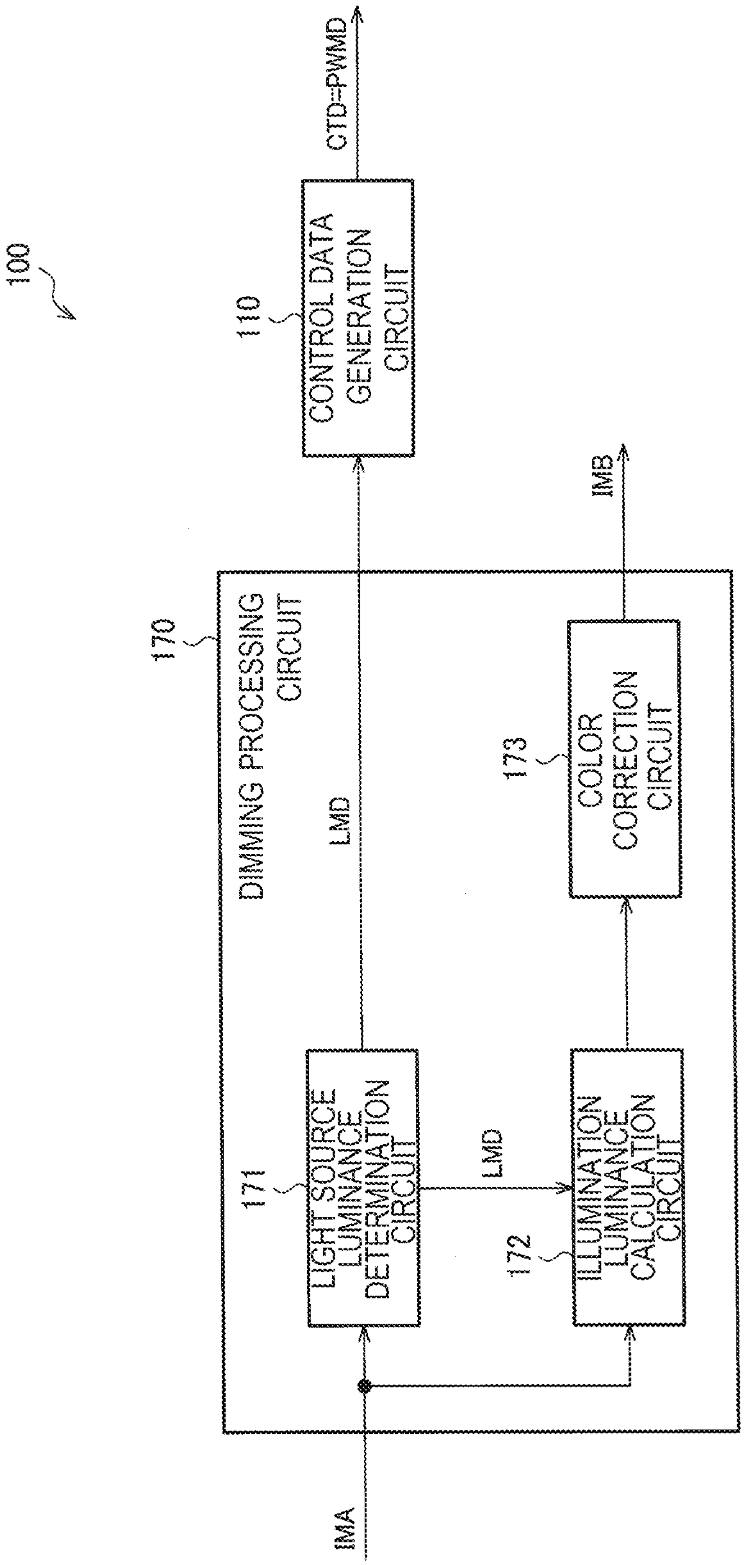
FIG. 15 shows a detailed configuration example of the controller when performing the local dimming processing.

FIG. 15 shows a detailed configuration example of the controller 100 when local dimming processing is performed. The controller 100 further includes a dimming processing circuit 170. In FIG. 15, the first storage circuit, the error detection circuit, and the first interface circuit are not illustrated.

The dimming processing circuit 170 performs local dimming processing based on the image data IMA. The dimming processing circuit 170 includes a light source luminance determination circuit 171, an illumination luminance calculation circuit 172, and a color correction circuit 173.

The light source luminance determination circuit 171 determines luminance data LMD indicating the light emission luminance of each light source of the backlight 810 by performing dimming processing using the image data IMA, and outputs the luminance data LMD to the control data generation circuit 110 and the illumination luminance calculation circuit 172. As a method of determining the luminance data LMD from the image data IMA, various known local dimming methods may be adopted. As an example, the light source luminance determination circuit 171 may generate the luminance data LMD of each light source by downsampling the image data IMA into image data in which one pixel corresponds to each light source.

The illumination luminance calculation circuit 172 obtains the luminance of the light reaching each pixel of the display panel 820 from each light source of the backlight 810 based on the luminance data LMD of each light source. The data indicating the luminance of the light reaching each pixel is referred to as illumination luminance data.

The color correction circuit 173 performs color correction on the image data IMA based on the illumination luminance data and outputs corrected image data IMB to the display driver 830. Specifically, the color correction circuit 173 divides pixel data of each pixel of the image data IMA by the illumination luminance data of the pixel, and sets the result as pixel data of each pixel of the image data IMB.

As described above with reference to FIG. 3, the error detection circuit 130 may include the first error check code generation circuit 131 that generates an error check code from the control data CTD generated by the control data generation circuit 110 and stores the error check code in the first storage circuit 120 as the first comparison data CP1. Further, the error detection circuit 130 may include the second error check code generation circuit 132 that generates an error check code from the control data CTD_RB received by the first interface circuit 140 and outputs the error check code as the second comparison data CP2, and the comparison circuit 135 that compares the first comparison data CP1 with the second comparison data CP2 and outputs the comparison result as the error signal ERR.

According to the embodiment, an error check can be performed on the control data CTD_RB read from the light source driver 200 by calculation of error check codes from the control data CTD and CTD_RB as the first comparison data CP1 and the second comparison data CP2 and comparison of the error check codes.

As described above with reference to FIG. 4, the error detection circuit 130 may include the first error check code generation circuit 131 that generates an error check code from the luminance data LMD input to the control data generation circuit 110 and stores the error check code in the first storage circuit 120 as the first comparison data CP1. Further, the error detection circuit 130 may include the conversion circuit 136 that converts the control data CTD_RB received by the first interface circuit 140 into the luminance data LMD_RB. Furthermore, the error detection circuit 130 may include the second error check code generation circuit 132 that generates an error check code from the luminance data LMD_RB output by the conversion circuit 136 and outputs the error check code as the second comparison data CP2, and the comparison circuit 135 that compares the first comparison data CP1 with the second comparison data CP2 and outputs the comparison result as the error signal ERR.

According to the embodiment, an error check can be performed on the control data CTD_RB read from the light source driver 200 by calculation of error check codes from the luminance data LMD and LMD_RB as the first comparison data CP1 and the second comparison data CP2 and comparison of the error check codes.

As described above with reference to FIG. 5, the first storage circuit 120 may store the control data CTD generated by the control data generation circuit 110 as the first comparison data CP1. The first interface circuit 140 may receive the control data CTD_RB from the light source driver 200 as the second comparison data CP2. The error detection circuit 130 may include the comparison circuit 135 that compares the first comparison data CP1 with the second comparison data CP2 and outputs the comparison result as the error signal ERR.

According to the embodiment, an error check can be performed on the control data CTD_RB read from the light source driver 200 by comparison between the control data CTD and CTD_RB as the first comparison data CP1 and the second comparison data CP2 instead of using error check codes.

As described above with reference to FIG. 6, the first storage circuit 120 may store the luminance data LMD input to the control data generation circuit 110 as the first comparison data CP1. The error detection circuit 130 may include the conversion circuit 136 that converts the control data CTD_RB received by the first interface circuit 140 into luminance data LMD_RB and outputs the converted luminance data LMD_RB as the second comparison data CP2. Further, the error detection circuit 130 may include the comparison circuit 135 that compares the first comparison data CP1 with the second comparison data CP2 and outputs the comparison result as the error signal ERR.

According to the embodiment, an error check can be performed on the control data CTD_RB read from the light source driver 200 by comparison between the luminance data LMD and LMD_RB as the first comparison data CP1 and the second comparison data CP2 instead of using error check codes.

As described above with reference to FIGS. 7 to 9, the first interface circuit 140 may transmit the control data CTD to the first light source driver 200-1 to the n-th light source driver **200-*n* including the light source driver 200, and then, receive the control data CTD_RB from the first light source driver 200-1 to the n-th light source driver 200-*n***. The n is an integer of 2 or more.

As described above with reference to FIGS. 7, 8, and 10, the first interface circuit 140 may sequentially transmit and receive the control data CTD and CTD_RB to and from the first light source driver 200-1 among the first light source driver 200-1 to the n-th light source driver **200-*n* including the light source driver 200, transmit and receive the control data CTD and CTD_RB to and from the second light source driver 200-2, . . . , and transmit and receive the control data CTD and CTD_RB to and from the n-th light source driver 200-*n***.

In the embodiment, since the control data CTD is written in the second storage circuit 230 and the data is read, transmission and reception of the control data CTD and CTD_RB cannot be performed simultaneously. According to the embodiment, when the controller 100 controls the plurality of light s 200-1 to **200-*n***, the control data CTD_RB can be received after the control data CTD is transmitted.

In the embodiment, the first interface circuit 140 may transmit and receive the control data CTD and CTD_RB in each frame. The error detection circuit 130 may compare the first comparison data CP1 with the second comparison data CP2 in each frame.

According to the embodiment, when there is a frame in which an error of the control data CTD and CTD_RB occurs, the error can be immediately detected.

As described above with reference to FIG. 13, the control data generation circuit 110 may generate the control data CTD for turning off the light source 300 when an error is detected by the error detection circuit 130.

Further, as described above with reference to FIG. 13, the controller 100 may include the dimming processing circuit 170 that generates the luminance data LMD by the dimming processing. When an error is detected by the error detection circuit 130, the dimming processing circuit 170 may stop the dimming processing and output the luminance data LMD having a given value.

Furthermore, as described above with reference to FIG. 13, when an error is detected by the error detection circuit 130, the first interface circuit 140 may transmit the signal EN for turning off the driving of the light source 300 by the light source driver 200 to the light source driver 200.

Moreover, as described above with reference to FIG. 13, the controller 100 may include the third interface circuit 160 that communicates with the host device 400 of the controller 100. When an error is detected by the error detection circuit 130, the third interface circuit 160 may transmit the error signal ERR to the host device 400.

According to these embodiments, various types of processing can be executed when an error is detected. For example, the light source 300 can be turned off or the light source 300 can be continuously turned on at fixed luminance. Turn-off or turn-on may be appropriately selected according to the purpose. For example, in a head-up display, when a light source is turned on with abnormal luminance, visibility of a real space that is originally seen through a screen may be reduced. In such a case, the light source 300 may be turned off when an error is detected. Alternatively, in an in-vehicle cluster panel or the like, the light source 300 may be turned on when an error is detected with priority on display of a warning lamp.

As described above with reference to FIGS. 14 and 15, the controller 100 may include the dimming processing circuit 170. The dimming processing circuit 170 may receive the image data IMA for displaying an image on the display panel 820 that lights enter from the plurality of light sources including the light source 300 and perform the local dimming processing based on the image data IMA to generate the luminance data LMD for each of the plurality of light sources. The plurality of light sources including the light source 300 correspond to the backlight 810 in the example of FIG. 14.

According to the embodiment, the luminance data LMD can be generated by the local dimming processing, the control data CTD can be generated from the luminance data LMD and transmitted to the light source driver 200, the control data CTD_RB can be read from the light source driver 200, and an error of the control data CTD_RB can be detected.

Although the embodiment has been described in detail above, it will be easily understood by those skilled in the art that many modifications can be made without substantially departing from the novel matters and effects according to the present disclosure. Accordingly, all of the modifications fall within the scope of the present disclosure. For example, a term described at least once in the specification or the drawings along with a different term having a broader meaning or the same meaning can be replaced with the different term anywhere in the specification or the drawings. All combinations of the embodiment and the modifications also fall within the scope of the present disclosure. The configurations, operations, and the like of the controller, the light source driver, the light source control system, the light source, the host device, the backlight, the display panel, the display controller, the display driver, the display system, the electronic apparatus, and the like are not limited to those described in the embodiment, and various modifications can be made.

What is claimed is:

1. A controller that transmits control data for controlling luminance of a light source to a light source driver that drives the light source based on the control data, the controller comprising:

a control data generation circuit configured to:
  receive luminance data indicating the luminance; and
  generate the control data based on the luminance data;

a first interface circuit configured to:
  receive the control data from the control data generation circuit; and
  transmit the control data to a second interface circuit of the light source driver, wherein a second storage circuit of the light source driver is configured to receive the control data from the second interface circuit and store the control data as second comparison data, and a drive circuit of the light source driver is configured to receive the control data from the second storage circuit and drive the light source based on the control data;

a first storage circuit configured to store first comparison data based on the luminance data or the control data from the control data generation circuit; and an error detection circuit configured to:
  receive the first comparison data from the first storage circuit;
  receive the second comparison data stored in the second storage circuit via the second interface circuit of the light source driver;
  perform error detection with respect to the control data by comparing between the first comparison data and the second comparison data; and
  generate an error signal corresponding to a state in which the first comparison data and the second comparison data are not matched.

2. The controller according to claim 1, wherein the first comparison data and the second comparison data are error check codes generated from the control data, error check codes generated from the luminance data, the control data, or the luminance data.

3. The controller according to claim 1, wherein the control data is PWM data indicating a pulse width of a pulse signal for driving the light source or current value data indicating a current value for driving the light source.

4. The controller according to claim 1, wherein the error detection circuit includes:

a first error check code generation circuit configured to generate a first error check code from the control data generated by the control data generation circuit and store the first error check code as the first comparison data in the first storage circuit;

a second error check code generation circuit configured to generate a second error check code from the control data received by the first interface circuit and output the second error check code as the second comparison data; and a comparison circuit configured to compare the first comparison data with the second comparison data and output a comparison result as the error signal.

5. The controller according to claim 1, wherein the error detection circuit includes:

a first error check code generation circuit configured to generate a first error check code from the luminance data input to the control data generation circuit and store the first error check code as the first comparison data in the first storage circuit;

a conversion circuit configured to convert the control data received by the first interface circuit into the luminance data;

a second error check code generation circuit configured to generate a second error check code from the luminance data output by the conversion circuit and output the second error check code as the second comparison data; and a comparison circuit configured to compare the first comparison data with the second comparison data and output a comparison result as the error signal.

6. The controller according to claim 1, wherein the first storage circuit stores the control data generated by the control data generation circuit as the first comparison data, the first interface circuit receives the control data from the light source driver as the second comparison data, and the error detection circuit includes a comparison circuit that compares the first comparison data with the second comparison data and outputs a comparison result as the error signal.

7. The controller according to claim 1, wherein the first storage circuit stores the luminance data input to the control data generation circuit as the first comparison data, and the error detection circuit includes:

a conversion circuit configured to convert the control data received by the first interface circuit into the luminance data and output the converted luminance data as the second comparison data; and a comparison circuit configured to compare the first comparison data with the second comparison data and output a comparison result as the error signal.

8. The controller according to claim 1, wherein the light source driver includes a plurality of the light source drivers corresponding to a first light source driver to an n-th light source driver, and the first interface circuit transmits the control data to the first light source driver to the n-th light source driver, and then, receives the control data from the first light source driver to the n-th light source driver, n being an integer of 2 or more.

9. The controller according to claim 1, wherein the light source driver includes a plurality of the light source drivers corresponding to a first light source driver to an n-th light source driver, and the first interface circuit sequentially performs transmission and reception of the control data to and from the first light source driver, transmission and reception of the control data to and from a second light source driver, and transmission and reception of the control data to and from the n-th light source driver among the first light source driver to the n-th light source driver, n being an integer of 2 or more.

10. The controller according to claim 1, wherein the first interface circuit transmits and receives the control data in each frame, and the error detection circuit compares the first comparison data with the second comparison data in the each frame.

11. The controller according to claim 1, further comprising a luminance data processing circuit configured to perform processing of changing a predetermined bit of the luminance data at predetermined time intervals and output the processed luminance data as a result of the processing to the control data generation circuit, wherein the first storage circuit stores the processed luminance data or the first comparison data based on the control data.

12. The controller according to claim 1, wherein the control data generation circuit generates the control data for turning off the light source when an error is detected by the error detection circuit.

13. The controller according to claim 1, further comprising a dimming processing circuit configured to generate the luminance data by dimming processing, wherein the dimming processing circuit stops the dimming processing and outputs the luminance data having a given value when an error is detected by the error detection circuit.

14. The controller according to claim 1, wherein the first interface circuit transmits a signal for turning off driving of the light source by the light source driver to the light source driver when an error is detected by the error detection circuit.

15. The controller according to claim 1, further comprising a third interface circuit configured to communicate with a host device of the controller, wherein the third interface circuit transmits the error signal to the host device when an error is detected by the error detection circuit.

16. The controller according to claim 1, further comprising a dimming processing circuit configured to receive image data for displaying an image on a display panel that lights enter from a plurality of light sources including the light source, and generate the luminance data for each of the plurality of light sources by performing local dimming processing based on the image data.

17. A light source control system comprising:

the controller according to claim 1; and the light source driver.

18. A display system comprising:

the controller according to claim 1;

the light source driver;

the light source; and a display panel to which light enters from the light source.

* * * * *